United States Patent [19]
Mahoney et al.

[11] Patent Number: 5,969,266
[45] Date of Patent: *Oct. 19, 1999

[54] FLOW METER PITOT TUBE WITH TEMPERATURE SENSOR

[75] Inventors: Ralene S. Mahoney, Boulder; Donald R. Verhaagen, Golden; John Everett Garnett, Boulder, all of Colo.

[73] Assignee: Dieterich Technology Holding Corp., Boulder, Colo.

[ * ] Notice: This patent is subject to a terminal disclaimer.

[21] Appl. No.: 09/020,096

[22] Filed: Feb. 6, 1998

Related U.S. Application Data

[63] Continuation-in-part of application No. 08/658,147, Jun. 4, 1996, Pat. No. 5,773,726.

[51] Int. Cl.$^6$ ........................................................ G01F 1/46
[52] U.S. Cl. ................................................................ 73/861.65
[58] Field of Search .................................................. 73/861.65

[56] References Cited

U.S. PATENT DOCUMENTS 5,773,726   6/1998   Mahoney et al. ................... 73/861.65

Primary Examiner—Benjamin R. Fuller
Assistant Examiner—Jewel V. Thompson
Attorney, Agent, or Firm—Richard W. Hanes

[57] ABSTRACT

A combined temperature and pressure sensing probe assembly for a flow measurement system comprising a body, a portion of which is adapted for insertion into fluid flowing in a confined conduit, such as a pipe. Within the body are separated plenums which are exposed respectively to high and low fluid pressures in the flow. A manifold block is that portion of the body which is disposed outside of the pipe containing the fluid flow. Along with valves and fluid conveying channels, the block is equipped with a duct for carrying electrical conductors and also contains a traversing bore which is aligned with the body and is in communication with the conductor carrying duct. An electrically responsive temperature sensor is disposed within or formed from the body. Conductors from the temperature sensor are directed from the manifold's bore through the connecting duct to a point exterior of the manifold.

16 Claims, 4 Drawing Sheets

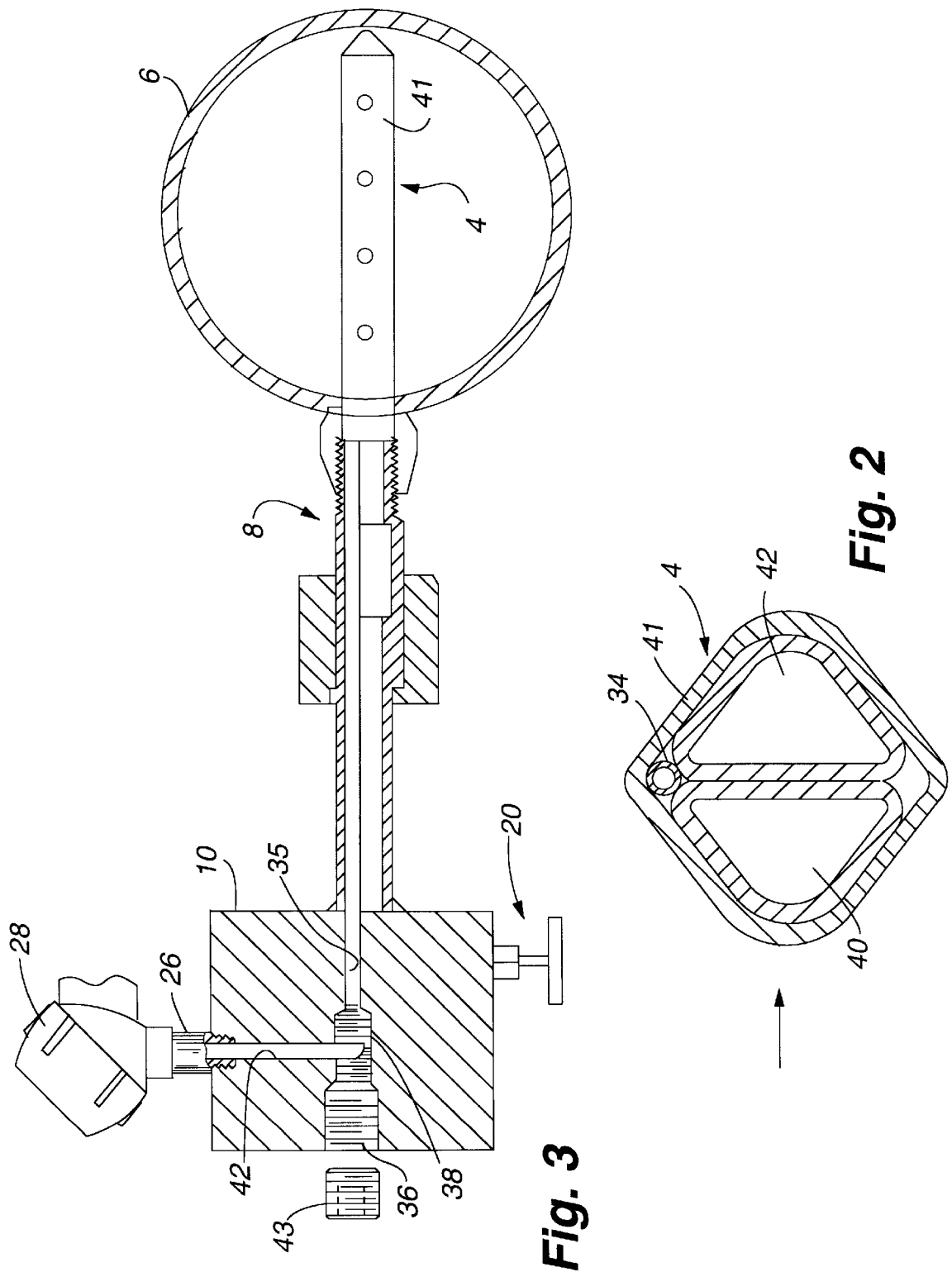

FLOW METER PITOT TUBE WITH TEMPERATURE SENSOR

This application is a continuation-in-part of application Ser. No. 08/658,147, filed Jun. 4, 1996, U.S. Pat. No. 5,773,726, for Flow Meter Pitot Tube With Temperature Sensor.

The present invention relates to thermodynamic measurement of the characteristics of fluid flow in confined conduits, such as pipes, and more particularly to apparatus for sensing the relevant differential upstream and downstream pressures and the temperature of the flowing fluid. By conveying and processing the information representative thereof, fluid flow variables, such as rate, volume and mass can be determined

BACKGROUND

Pitot tube flow sensors of the type disclosed in U.S. Pat. No. 4,559,836 to Darrel F. Coleman et al. have been in use for many years in differential pressure flow measurement systems. Such systems detect the average fluid impact, or high, pressure exerted on the upstream facing side of the pitot tube and detect the low fluid pressure on the downstream facing side of the tube. Traditionally, the high and low fluid pressures have been applied to a pressure transducer in order to derive an electrical signal representative of the differential pressure. By known mathematical relationships, the differential pressure is converted to a fluid flow rate.

The fluid pressures sensed and conveyed by the pitot tube or other kind of differential pressure sensor, such as an orifice plate, for example, are conveyed to the pressure transducer through an interconnecting head, such as the one shown by reference numeral 24 in the said '836 U.S. Patent, or by a valve manifold, such as the one shown by reference numeral 17 in U.S. Pat. No. 4,466,290 to Roger L. Frick.

When it is desired to sense the temperature of the medium flowing in the pipe, temperature sensing devices such as a Thermowell RTD (Resistive Temperature Device) have been used, inserting the RTD into a protective sheath, such as a "Thermowell", which is immersed in the fluid whose temperature is being sensed. Typically, the temperature sensor is introduced into the flowing fluid at a location separate from that of the flow rate sensor, creating additional problems associated with opening and then sealing the conduit wall around anything inserted therein.

In the continued development of sophisticated flow measurement systems for process fluids it has become increasingly important to be able to measure the volume and mass of the fluid, as well as its flow rate. In order to do that, however, temperature of the fluid must be known. Because the intrusive measurement of various parameters of a fluid flowing in a pipe requires penetration of the pipe, it becomes increasingly important to sense the required parameters with a single instrument, requiring only one intrusion into the pipe.

It is therefore, the primary aspect of the present invention to provide a single apparatus for sensing the temperature of a fluid flowing in a confined channel (a pipe, for example), as well as determining the differential pressure that is detected by a rate of flow sensor.

A second object of the invention is to provide a combination temperature and pressure sensing device for fluid flowing in a pipe that will allow the temperature sensing portion of the assembly to be removed and replaced without having to also remove the differential pressure sensor from the pipe.

Another aspect of the present invention is to advantageously use the available space inside of a prior art pitot tube to house a temperature-sensing device.

A still further object of the present invention is to utilize a pitot tube type of sensor body as the carrier of a temperature sensor within the conduit carrying the flowing fluid.

And a still further object of the present invention is to provide temperature sensing of the fluid contained within a fluid flowmeter assembly, whether within the primary fluid carrying conduit or within some portion of the assembly that is exterior to the conduit.

Other and further objects, features and advantages of the invention will become apparent upon a reading of the detailed description of a preferred form of the present invention.

DESCRIPTION OF THE DRAWINGS

FIG. 2 is an enlarged cross sectional view taken along line 2—2 of FIG. 1.

FIG. 3 is a longitudinal cross section of the differential pressure flow sensor of the present invention, including the pipe into which the combined pressure and temperature sensor elements are inserted and including the manifold head that is mounted on the proximal end of the sensor probe, exteriorly of the fluid conducting conduit.

DETAILED DESCRIPTION OF THE INVENTION

Figure 1:
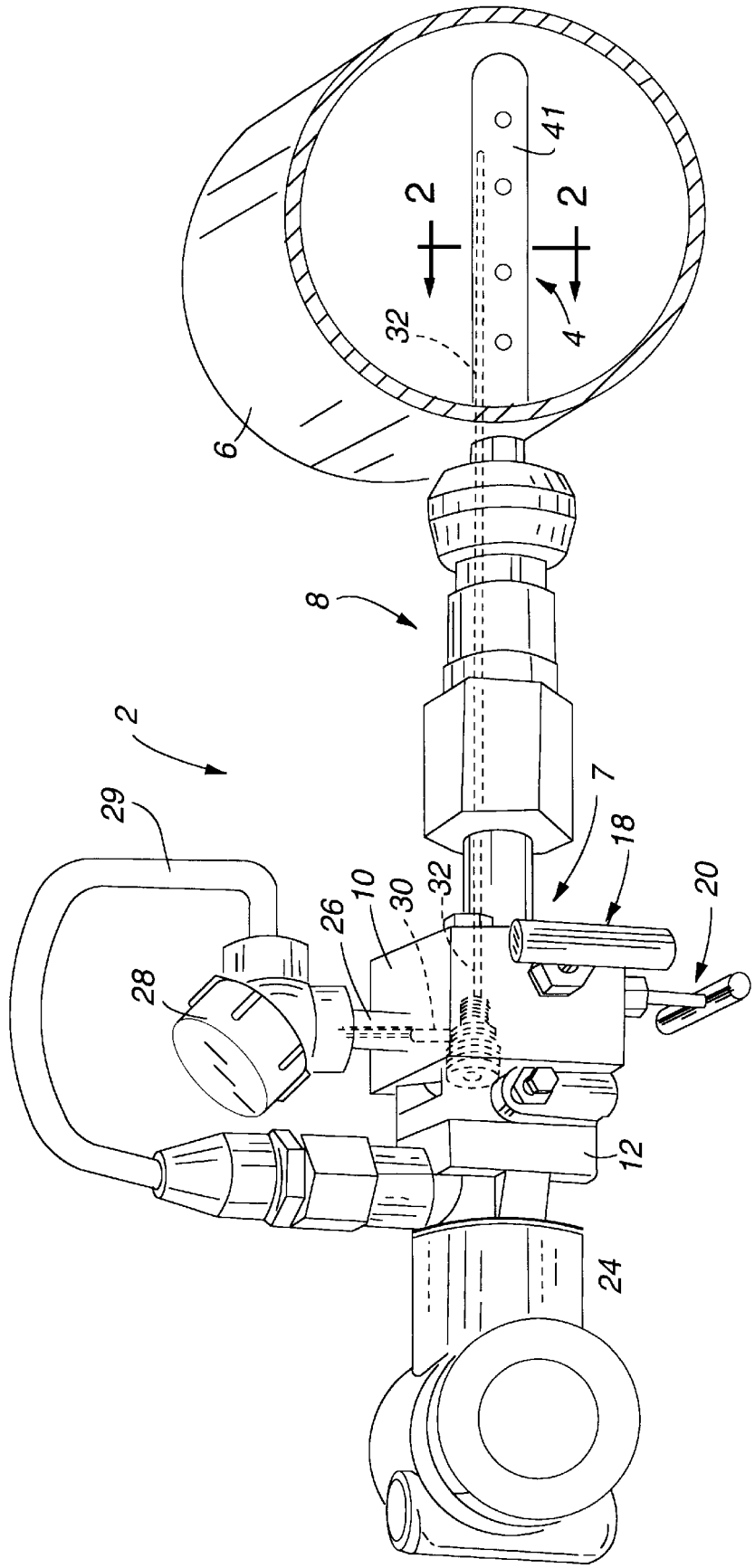
FIG. 1 is perspective view of a thermodynamic measurement assembly for fluid flowing in a conduit in which assembly the elements of the present invention function.
Figure 4:
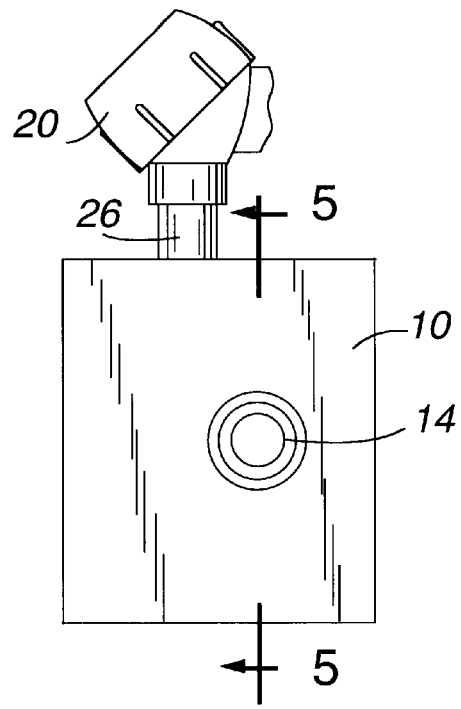
FIG. 4 is an end view of the manifold of the present invention showing the riser that supports the terminal housing on one side of the manifold and the receptacle for one of the pressure valves on the end shown. The opposite end is a mirror image of the end shown.
Figure 5:
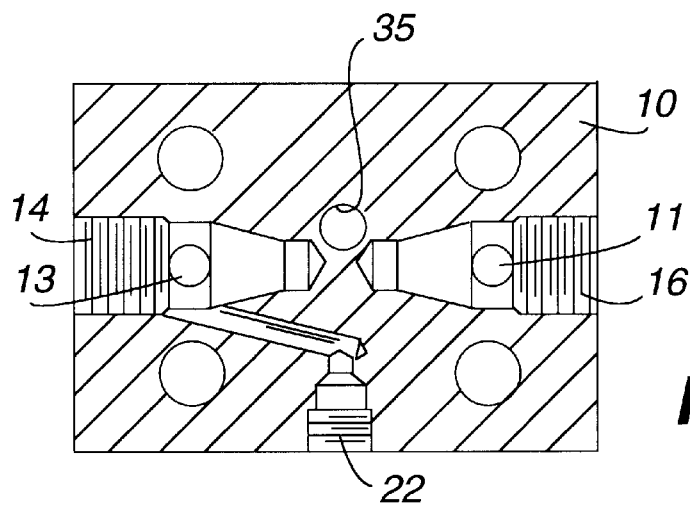
FIG. 5 is a cross sectional view of the manifold, taken along lines 5—5 of FIG. 4.
Figure 6:
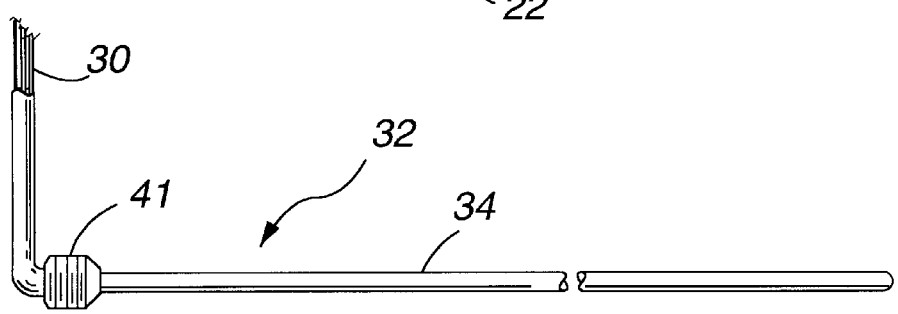
FIG. 6 is a side view of the preferred form of temperature sensor.

FIG. 1 illustrates a flow measurement assembly 2 having the combined elements of the present invention. The primary fluid differential pressure measuring portion of the system comprises a pitot tube type of flow sensor 4 (generally described in the above referenced U.S. Pat. No. 4,559,836, to which reference is hereby made). The sensing probe 4 is inserted diametrically into a fluid carrying conduit, or pipe 6. The mounting hardware, which forms no part of the present invention, is shown generally by reference numeral 8. The proximal end 7 of the pitot tube terminates in a manifold head 10 where the high and low pressure fluids are conveyed though interior channels of the manifold to a pressure transducer 12 mounted directly to the manifold 10. The pitot tube and manifold combine to form a fluid pressure conducting body. As shown in FIG. 5, the interior fluid conducting conduits 11 and 13 in the manifold pass respectively through a pair of shut off valves (not shown) that are disposed in threaded receptacles 14 and 16 of the manifold. The operating handle 18 of one of the two valves is shown in FIG. 1. An equalizing valve, whose handle is shown in FIG. 1, is positioned in the third threaded receptacle 22 in the manifold. The equalizing valve may be opened to interconnect the high and low pressure conduits 11 and 13 to equalize the fluid pressure in the manifold for the purpose of calibrating a transmitter 24.

Attached to the pressure transducer 12 is a differential pressure transmitter 24, but which, in the context of this invention, processes and transmits signals representative of the mass and volume of the fluid flowing in the pipe 6, as well as differential pressure and fluid flow rate.

Attached to one face of the manifold 10 is a riser 26 that supports a housing 28, containing an electrical terminal (not shown). The terminal inside the housing 28 interconnects the wiring 30, from a temperature sensing device, with wiring inside a conductor 29 to conduct the electrical signal from a temperature sensor 32 into the transmitter 24 for use in determining the mass and/or volume of the fluid in the pipe 6.

The temperature-sensing device 32 is preferably a resistive temperature device, such as the ARI and Weed RTD manufactured by Texas Thermowell, Inc. Such a device comprises an elongated rigid resistive element 34 having conductors 30 that convey a signal from the resistive element to a further signal processing site, such as the transmitter 24.

Referring now to FIGS. 1 and 2, the temperature sensor is seen in its installed position within the pitot tube 4 in a space occurring between the high and low fluid pressure conducting plenums 40 and 42 and the tubular housing 41.

As seen in FIG. 3, the manifold 10, in addition to the valves and conduits already mentioned, contains a bore 35 which traverses through the body of the manifold. The bore 35 is sized and positioned in the manifold to act as a conduit through which the rigid resistive element 34 of the RTD temperature sensor 32 is passed during its insertion into, or retraction from, the pitot tube 4. When the rigid portion 34 of the temperature sensor is fully inserted into the pitot tube, the temperature sensor conductors 30 are then trained through a transverse duct 42 in the manifold 10, which duct is in communication with the riser 26. The conductors are run through the riser to be connected to the terminal in the housing 28.

One end of the bore 35 is provided with two radially enlarged and threaded receptacles 36 and 38, of different diameters. After the temperature sensor 32 is in position in the pitot tube and the manifold, a threaded collar 41 on the proximal end of the elongated resistive portion 34 of the temperature sensor is threaded into the small receptacle 38 for the purpose of mounting and securing the temperature sensor. After the temperature sensor is thus secured, a threaded sealing plug 43 is screwed into the larger outer receptacle 36 after which the pressure transducer 12 can be attached to the manifold, as it is shown to be in FIG. 1.

Figure 7:
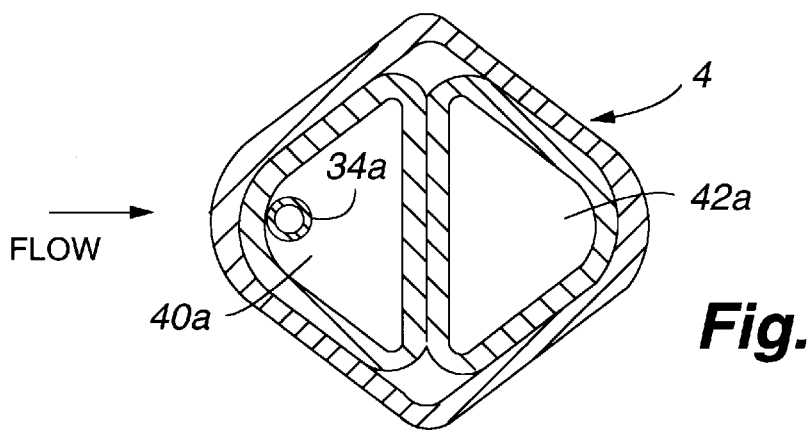
FIG. 7 is a view similar to FIG. 2 but showing an alternative placement of the temperature sensor within one of the fluid conducting plenums.

While the inserted position of the temperature sensor shown in FIGS. 1 and 2 is preferred for the illustrated design of pitot tube, other configurations are possible and may even be favored for pitot tubes of different design and configuration. One such alternative embodiment is to place the temperature sensor directly into one of the fluid conducting plenums, such as the fluid conductors 40 and 42, shown in FIG. 2. Such a configuration would be suggested where the body of the probe comprises only a pair of high and low fluid pressure conductors and where there is no housing, such as the housing 41 shown in FIG. 2. An example of such a configuration is shown in FIG. 7 where the temperature sensing probe 34a is disposed within the high pressure fluid conducting plenum 40a. The low pressure fluid conducting plenum is shown by reference numeral 42a.

Figure 8:
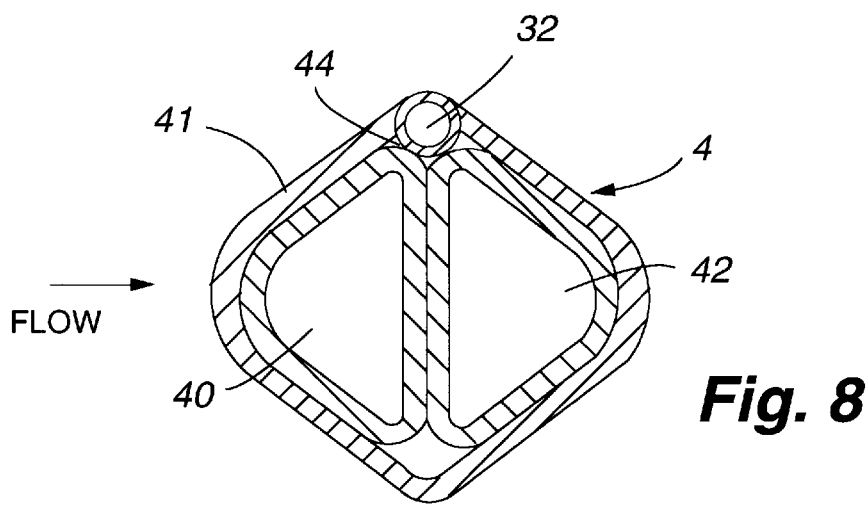
FIG. 8 is a view similar to FIG. 2 but showing another alternative placement of the temperature sensor exteriorly of the fluid conducting plenums and configured to conform to the profile of the exterior surface of the pitot tube body.

In yet another embodiment, the temperature-sensing device may be mounted exteriorly of the fluid conducting channels 40 and 42 in direct contact with the fluid flowing within the conduit. If the temperature sensor was one having a form that did not create interference with the flow of the fluid over and around the surfaces of the pitot tube body, then the sensor could be attached without other modification of the tube. However, if the temperature sensor is of such size and configuration that normal flow patterns around the tube would be adversely influenced by exterior mounting, then the sensor must be incorporated into the structure of the tube so that the sensor itself becomes part of the exterior contour of the tube. An example of such construction is shown in FIG. 8. One edge of the pitot tube 4 is formed into a slot 44 wherein a temperature sensing device 32 may be inserted. The slot 44 is configured such that the inserted temperature sensing device 32 creates effectively identical flow profile characteristics as would have been present without the inclusion of the sensor 32.

Figure 9:
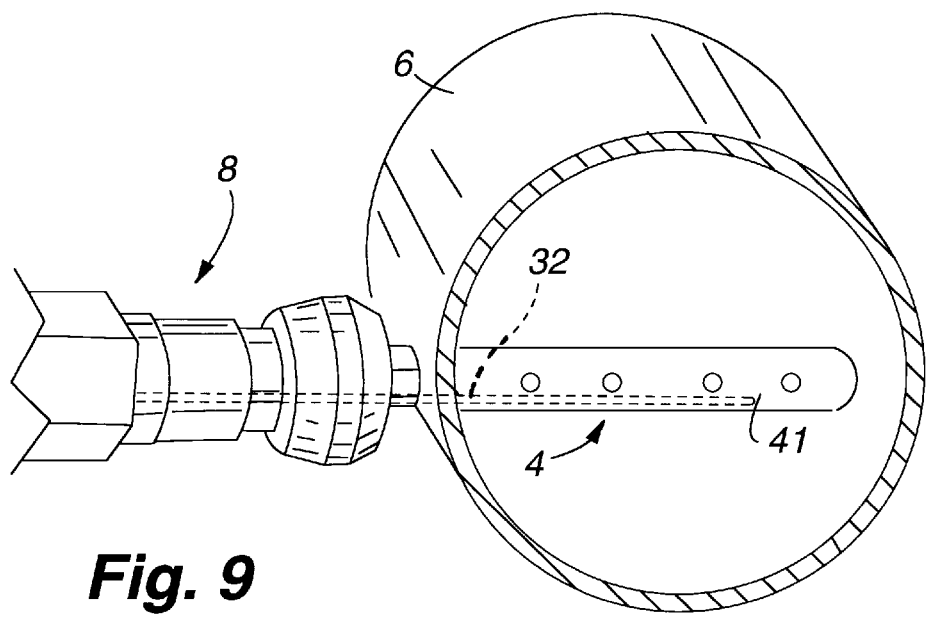
FIG. 9 is a view similar to that of FIG. 1 except that it illustrates only that portion of the assembly below the manifold. The view illustrates an alternative placement of the temperature sensor, within that portion of the fluid conducting plenums that is exterior of the main fluid carrying conduit.

A further alternative embodiment of the invention contemplates the temperature sensor being mounted in contact with the fluid whose temperature is being measured, but exteriorly of the conduit in which the fluid is flowing. For example, the temperature sensor could be inserted into the fluid carrying channels of the manifold 10, as shown in dotted lines in FIG. 5 and referenced by numeral 33. The temperature sensor can also be disposed in the portions of the high and low pressure fluid conducting channels of the pitot tube that are exterior of the main fluid carrying conduit. Such a configuration is shown in FIG. 9 where the temperature sensor 34b is shown disposed within that portion of the high pressure fluid conducting plenum 40b that is exterior of the fluid carry conduit 6. When the temperature sensor is disposed exteriorly of the conduit 6, some form of compensating calibration may be required to make up for the possible change in temperature of the fluid after it leaves the conduit 6.

We claim:

1. A thermodynamic sensing probe for fluid measurement comprising, a body, a portion of which is adapted for insertion into a fluid in a confined conduit, comprising a plurality of fluid carrying conductors which are respectively exposed to high and low pressures in the said fluid; and a temperature sensor carried by the body for sensing the temperature of the fluid.

2. The combination of claim 1 wherein the temperature sensor is carried within at least one of the fluid conductors.

3. The combination of claim 2 wherein the temperature sensor is disposed within at least one of the fluid conductors exteriorly of the confined conduit.

4. The combination of claim 1 wherein the temperature sensor is carried exteriorly of the fluid conductors.

5. A thermodynamic sensing probe for insertion into a confined conduit, through a single opening in the wall thereof, for measuring the characteristics of a fluid flowing therein, comprising, a body, a portion of which is adapted for insertion through the opening in the wall of the conduit and into contact with the fluid in the conduit, where the body comprises;

an upstream facing component;

a plurality of fluid conductors which are respectively exposed to high fluid pressure on the upstream facing component of said body and low fluid pressure downstream of said upstream facing component; and a temperature sensor carried by the body for sensing the temperature of the fluid within the conduit.

6. The combination of claim 5 wherein the temperature sensor is carried within at least one of the fluid conductors.

7. The combination of claim 5 wherein the temperature sensor is carried exteriorly of the fluid conductors.

8. The combination of claim 5 wherein the temperature sensor is electrically responsive and has an output.

9. The combination of claims 1 or 5 wherein the body includes, a tubular housing in which the fluid conductors are disposed and further including, a duct within said tubular housing wherein at least a portion of the temperature sensor is disposed.

10. The combination of claim 5 and further including, a manifold attached to that portion of the body that is disposed outside of the confined fluid carrying conduit, said manifold having a plurality of valved passages in fluid communication with the said high and low pressure fluid carrying conductors of the body.

11. The combination of claim 10 wherein the temperature sensor is disposed within at least one of the valved passages in the manifold.

12. The combination of claim 10 wherein the manifold includes a bore therethrough and through which bore the temperature sensor may be passed in the process of inserting or removing the temperature sensor from within the body.

13. The combination of claim 10 and further comprising:

a pressure transducer in fluid communication with said valved passages of the manifold for converting the fluid pressures present therein to at least one electrical signal representative of the difference between the fluid pressure upstream of said body and the fluid pressure immediately downstream of said body.

14. The combination of claim 13 and further comprising:

a transmitter responsive to at least one electrical signal from said pressure transducer and to the temperature sensor.

15. A sensing probe assembly for measuring the characteristics of fluid flowing within a confined conduit, comprising, a body, a portion of which is adapted for insertion through an opening in the wall of the said conduit and into contact with the fluid in the conduit, where the body comprises a pair of fluid conductors which are respectively exposed to high and low pressures in the said flowing fluid; and electrically responsive temperature sensing means carried by the body through the opening in the wall of the said conduit for sensing the temperature of the fluid within the conduit.

16. A thermodynamic state sensing probe assembly for insertion into fluid flowing in a conduit, having:

a body having an upstream facing component and comprising, a first pressure conductor exposed to the fluid pressure upstream of said body, a second pressure conductor exposed to the fluid pressure downstream of said upstream facing component; and a temperature sensor carried by the body.

* * * * *